G. WALTHER.
METAL WHEEL.
APPLICATION FILED OCT. 8, 1917.
1,287,150.
Patented Dec. 10, 1918.
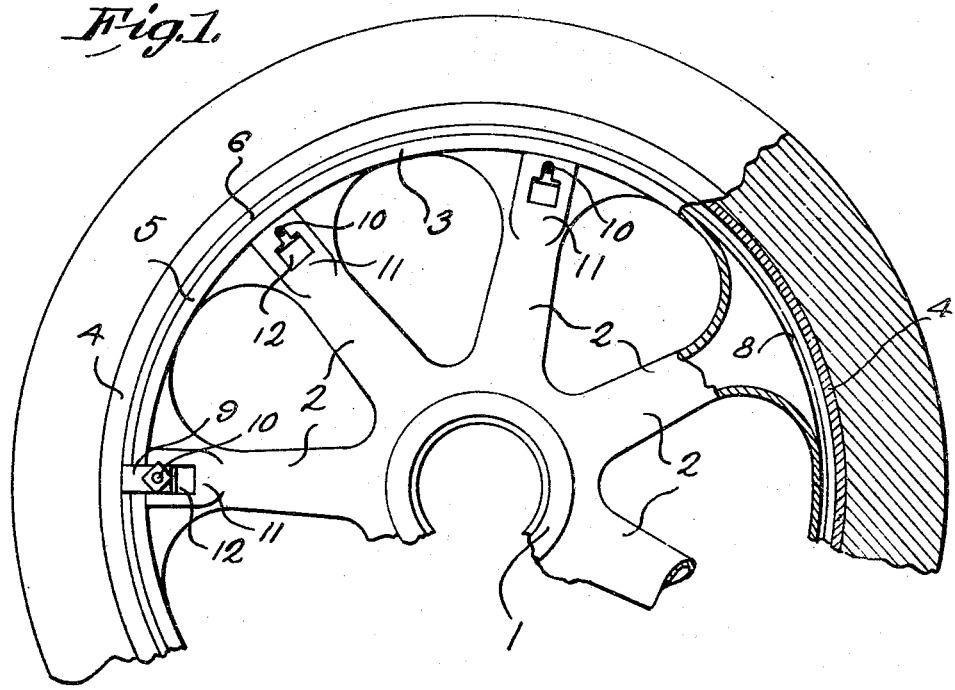
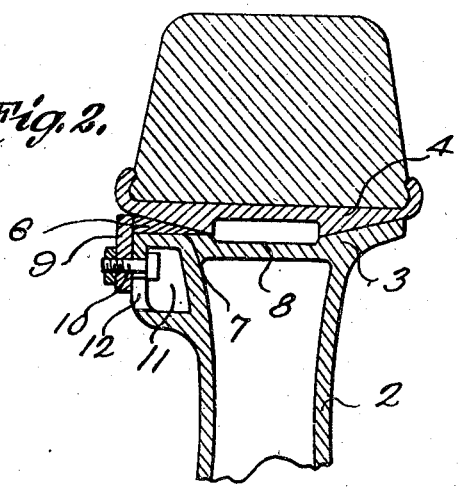
INVENTOR
George Walther,
BY
Edward H. Reed.
ATTORNEY

UNITED STATES PATENT OFFICE.

GEORGE WALTHER, OF DAYTON, OHIO.

METAL WHEEL.

1,287,150.

Specification of Letters Patent.

Patented Dec. 10, 1918.

Application filed October 8, 1917. Serial No. 195,274.

*To all whom it may concern:*

Be it known that I, GEORGE WALTHER, a citizen of the United States, residing at Dayton, in the county of Montgomery and State of Ohio, have invented certain new and useful Improvements in Metal Wheels, of which the following is a specification, reference being had therein to the accompanying drawing.

This invention relates to metal wheels and more particularly to a metal wheel designed to have mounted thereon a demountable rim.

The object of the invention is to provide a wheel of this kind which will possess great strength and will at the same time be of relatively light weight.

It is also an object of the invention to provide a wheel of this kind in which but few parts will be required to secure the demountable rim in position, and these parts will be of such a character that they may be quickly and easily applied to the wheel under any and all circumstances.

It is also an object of the invention to provide a wheel of this kind which will be very simple in its construction, and which can be easily manufactured.

In the accompanying drawings Figure 1 is a side elevation, partly broken away, of a wheel embodying my invention; and Fig. 2 is a transverse sectional view of the rim of such a wheel.

In these drawings I have illustrated one embodiment of my invention and have shown the same as comprising a hub 1 having spokes 2 cast integral therewith and connecting the same with a rim 3 which is also cast integral with the spokes. The spokes are preferably hollow and have their outer ends flared, or extending in broad curves to their points of junction with the rim. The rim of the wheel is preferably solid and is tapered to receive and support a demountable rim 4 which, in the form here shown, has its opposite edges beveled. The wheel rim 3 has one of its circumferential edges inclined outwardly as shown at 5 to correspond to the bevel on the adjacent side of the demountable rim and adapted to engage the demountable rim to limit the movement thereof. The opposite side, or circumferential portion, of the wheel rim is shaped to receive a clamping member, or ring, which, in the present instance, is wedge-shaped in cross-section as shown at 6 and is adapted to engage the adjacent beveled edge of the demountable rim, and when forced firmly into position between the demountable rim and the wheel rim to coöperate with the part 5 of the wheel rim to hold the demountable rim firmly in position thereon. Preferably that portion of the wheel rim upon which the clamping ring 6 rests is flat, as shown at 7, but obviously this shape may be varied to accommodate the same to variations in the character of the clamping member. The central portion of the wheel rim, which lies between the inclined portion 5 and the flat portion 7, is preferably depressed as shown at 8, thus causing the demountable rim to be supported by the side portions of the wheel rim and avoiding the necessity of machining the rim, or otherwise accurately forming the same to fit the demountable rim. The clamping ring 6 is held in position by means of retaining devices, which are here shown in the form of clips 9 connected by means of bolts 10 with the wheel at points adjacent to the part 7 of the wheel rim. In order that these retaining devices may be very easily placed in position I have provided the wheel with a series of cavities, as shown at 11, having slotted outer walls through which the bolts 10 extend. The cavities may be of any suitable size but in order to reduce the weight of the wheel, and the metal required to make the wheel, to a minimum I have made these cavities just large enough to accommodate the retaining devices and have provided a separate cavity for each retaining device. The cavity and the outer wall thereof may be of any suitable shape to facilitate the placing in position of the retaining device or bolt, but I have here shown the wall of the cavity as connected with the wheel along all of its edges and have provided the slot, which is shown at 12, with an enlarged portion to permit of the insertion of the bolt head. In the present construction the cavities are mounted adjacent to the ends of the respective spokes and the wall of the cavity is cast integral with the adjacent portions of the wheel rim and spokes. While I have here shown the retaining device at the end of each spoke it will be obvious that any desired number of such devices may be employed and additional cavities may be provided to receive the same.

With the exception of the clamping ring and its retaining devices the wheel is cast in a single piece, the supporting wall for the retaining devices being integral with the other parts of the wheel. Consequently the wheel is very strong, and because of the construction and arrangement of the parts a relatively small amount of metal is required. By forming the wheel rim with the inclined portion 5 I dispense with an additional clamping member and the retaining devices therefor and am enabled to support the demountable rim directly upon this portion of the wheel rim, thus not only simplifying the construction, but materially reducing the effort necessary to attach the demountable rim to the wheel and materially increasing the strength of the assembled wheel. The arrangement of the cavities and their supporting walls for the retaining devices is such that these devices can be quickly and easily placed in position or removed at any time, either in the shop or on the road. The manner of forming the cavities is such that the supporting walls for the retaining devices possess great strength and there is no liability of their giving away under any strains which may be imposed thereon.

While I have shown and described one embodiment of my invention, I wish it to be understood that I do not desire to be limited to the details of construction as various modifications will occur to a person skilled in the art.

Having now fully described my invention, what I claim as new and desire to secure by Letters Patent, is:—

1. In a metal wheel, a hub, spokes, a rim formed in one piece with said spokes and adapted to receive a demountable rim, one edge of the first mentioned rim being shaped to coöperate with a clamping member and having rigidly secured thereto a plurality of separated supplemental walls spaced about the same, extending downwardly therefrom and slotted to receive a retaining device for said clamping member.

2. In a metal wheel, a hub, spokes, a rim formed in one piece with said spokes and adapted to receive a demountable rim, said wheel having individual cavities formed therein near the first mentioned rim and spaced about the same, the outer wall of each of said cavities being slotted and having a plurality of its edges connected with said wheel, and retaining devices having parts adapted to enter said cavities and to extend through the slots therein.

3. In a metal wheel, a hub, spokes, a rim formed in one piece with said spokes and adapted to receive a demountable rim, said wheel having cavities formed therein adjacent to the first mentioned rim and spaced about the same, the outer wall of each cavity being connected at all its edges with said wheel, and having a slot to receive a part of a retaining device for said demountable rim.

4. In a metal wheel, a hub, spokes, a rim formed in one piece with said spokes adapted to receive a demountable rim, said wheel having a cavity formed adjacent to each of said spokes and having its outer wall integrally connected at all its edges with said spoke and said rim, said outer wall being provided with a slot having an enlarged portion, and a retaining device comprising a bolt adapted to be inserted in said slot.

5. In a metal wheel, a hub, spokes, a rim formed in one piece with said spokes and having one of its circumferential side portions inclined outwardly and having its other circumferential side portion shaped to receive the clamping ring, that portion of said rim lying between said side portions being depressed toward said hub, said wheel having cavities arranged along the inner side of said last-mentioned rim and provided with slotted walls adapted to receive retaining devices.

In testimony whereof, I affix my signature hereto.

GEORGE WALTHER.